United States Patent [19]

Sato et al.

[11] 4,438,629

[45] Mar. 27, 1984

[54] APPARATUS FOR SIMULTANEOUSLY ADJUSTING FLUID PRESSURES IN A DUAL FLUID SYSTEM AND ASSOCIATED METHOD

[75] Inventors: Makoto Sato, Kamifukuoka; Etsuo Fujii, Wako, both of Japan

[73] Assignee: Honda Giken Kogyo Kabushiki Kaisha, Tokyo, Japan

[21] Appl. No.: 390,039

[22] Filed: Jun. 18, 1982

[30] Foreign Application Priority Data

Jun. 25, 1981 [JP] Japan ................................. 56-98976

[51] Int. Cl.³ .............................................. F15B 7/08
[52] U.S. Cl. ...................................... 60/579; 60/581; 60/591; 60/545; 60/593; 303/6 C; 303/113; 92/75
[58] Field of Search ................. 60/579, 581, 591, 545, 60/582, 593; 92/75, 50, 69, 152; 303/6 C, 113, 119

[56] References Cited

U.S. PATENT DOCUMENTS

| | | | |
|---|---|---|---|
| 2,597,404 | 5/1952 | Teske ..................... | 60/579 |
| 3,529,871 | 9/1970 | Burckhardt et al. ............. | 303/6 C |
| 3,958,838 | 5/1976 | Totschnig ................ | 303/6 C |
| 4,315,659 | 2/1982 | Hayashi et al. ................. | 303/119 |

Primary Examiner—Robert E. Garrett
Assistant Examiner—Richard S. Meyer
Attorney, Agent, or Firm—Posnack, Roberts, Cohen & Spiecens

[57] ABSTRACT

A method and apparatus for simultaneously adjusting the fluid pressures in a dual hydraulic circuit arrangement in which in a first hydraulic circuit pressurized fluid is supplied from a first pressure source to a first fluid pressure activated device and in a second hydraulic circuit pressurized fluid is supplied from a second pressure source to a second pressure activated device, comprising a cylinder having opposite closed ends and spaced bulkheads therein defining a central chamber between the bulkheads and a pair of chambers on respective opposite sides of the bulkheads. A pair of spaced first pistons are slidably mounted in the central chamber to define a control pressure chamber therebetween and first and second primary fluid pressure chambers between respective pistons and the bulkheads. The first primary fluid pressure chamber is connected to the first pressure source while the second primary fluid chamber is connected to the second pressure source. A pair of second pistons are secured for common movement with the first pistons and the second pistons are respectively mounted between the bulkheads and the closed ends of the cylinder to define first and second secondary fluid pressure chambers between the second pistons and respective bulkheads. The first and second secondary chambers are respectively connected to the first and second fluid pressure activated devices and a pressure fluid is supplied at a control pressure from a third pressure source to the control pressure chamber between the first pistons for simultaneously adjusting the pressures in the first and second secondary chambers and thereby the pressures in the first and second pressure activated devices.

13 Claims, 2 Drawing Figures

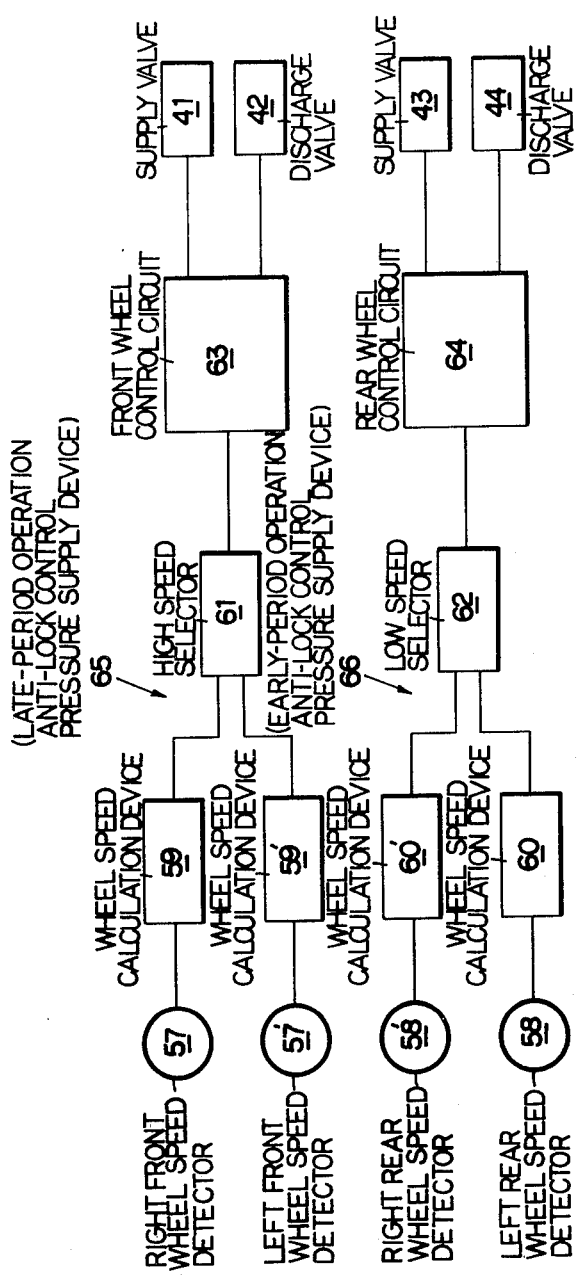

APPARATUS FOR SIMULTANEOUSLY ADJUSTING FLUID PRESSURES IN A DUAL FLUID SYSTEM AND ASSOCIATED METHOD

FIELD OF THE INVENTION

The present invention relates to a dual fluid pressure system and associated methods of operation in which the dual system comprises two systems each of which produces a secondary fluid pressure in response to a primary fluid pressure delivered by an independent fluid pressure source, the secondary fluid pressure being delivered to corresponding fluid pressure operated devices to operate the latter. More particularly, the present invention relates to apparatus and methods for simultaneously adjusting the secondary pressures in each fluid pressure system of a dual fluid pressure system.

PRIOR ART

In general, in a dual fluid pressure system having two systems, the flow of fluid takes place independently in each system. Therefore, when it is required to adjust the fluid pressures for fluid operated devices associated with both systems, it is necessary to effect the adjustment for each system independently, while avoiding the mixing of fluid between two systems. This requires a complicated arrangement of fluid lines and a complicated construction of the fluid pressure adjusting devices.

Hitherto, it has been rather difficult to obtain a device for simultaneously adjusting the fluid pressures in two systems of a dual fluid pressure system, having a simple circuit arrangement, high reliability of operation and a high utility.

SUMMARY OF THE INVENTION

Accordingly, it is a primary object of the invention to provide apparatus for simultaneously adjusting fluid pressures in two systems of a dual fluid system, of simple construction, high reliability of operation, simple circuit arrangement and high utility.

The dual fluid system consists of a dual hydraulic circuits arrangement in which in a first hydraulic circuit pressurized fluid is supplied from a first pressure source to a first fluid pressure activated device, and in a second hydraulic circuit pressurized fluid is supplied from a second pressure source to a second fluid pressure activated device.

In accordance with the invention, the apparatus for simultaneously adjusting the fluid pressures comprises a cylinder having opposite closed ends and including spaced bulkheads therein defining a central chamber between the bulkheads and a pair of chambers on respective opposite sides of the bulkheads. A pair of spaced first pistons are slidably mounted in the central chamber and define a control pressure chamber therebetween the first and second primary fluid pressure chambers between respective pistons and the bulkheads. The first primary fluid pressure chamber is connected to the first pressure source and the second primary fluid pressure chamber is connected to the second pressure source.

A pair of second pistons are secured for common movement with the first pistons, said second pistons being respectively mounted between the bulkheads and the closed ends of the cylinders to define first and second secondary fluid pressure chambers between the second pistons and respective bulkheads. The first and second secondary chambers are respectively connected to the first and second fluid pressure activated devices of the first and second hydraulic circuits. In further accordance with the invention, means are provided for supplying a pressure fluid at a control pressure from a third pressure source to said control pressure chamber between said first pistons for simultaneously adjusting the pressures in said first and second secondary chambers and thereby in said first and second pressure activated devices of said first and second hydraulic circuits.

The invention further contemplates the provision of first cup-shaped sealing members attached to the bulkheads on the sides thereof facing the respective primary fluid pressure chambers and second cup-shaped sealing members attached to the second pistons on the sides thereof facing the secondary fluid pressure chambers.

In further accordance with the invention, a second cylinder is provided of the same construction as the first cylinder and connected in series therewith such that the first and second primary fluid pressure chambers of the second cylinder are respectively connected to the first and second primary fluid pressure chambers of the first cylinder whereas the first and second secondary fluid pressure chambers of the second cylinder are respectively connected to third and fourth pressure activated devices respectively included in the first and second hydraulic circuits. A pressure fluid from the third source is supplied to the control pressure chamber of the second cylinder.

A further object of the invention is to provide a method for simultaneously adjusting the fluid pressures in the dual hydraulic circuit arrangement as set forth previously.

In order to satisfy the above object, the method comprises supplying the fluid pressures in the first and second hydraulic circuits to respective first and second primary chambers bounded by respectable slidable pistons which permit expansion and contraction of said primary chambers and supplying the first and second fluid pressure activated devices with pressurized fluid from respective first and second secondary fluid chambers bounded by respective additional slidable pistons which permit expansion and contraction of said secondary chambers. The method further comprises contracting said primary chambers simultaneously in response to a control pressure from a third pressure source and expanding said secondary chambers in response to the contracting of said primary chambers and in proportion thereto to adjust the pressures in said fluid pressure activated devices in said first and second hydraulic circuits.

The above and other objects, features and advantages of the invention will become clear from the following description of preferred embodiments taken in conjunction with the accompanying drawings.

BRIEF DESCRIPTION OF THE DRAWINGS

FIG. 2 is a signal diagram of the anti-lock braking system.

DESCRIPTION OF THE PREFERRED EMBODIMENT

Figure 1:
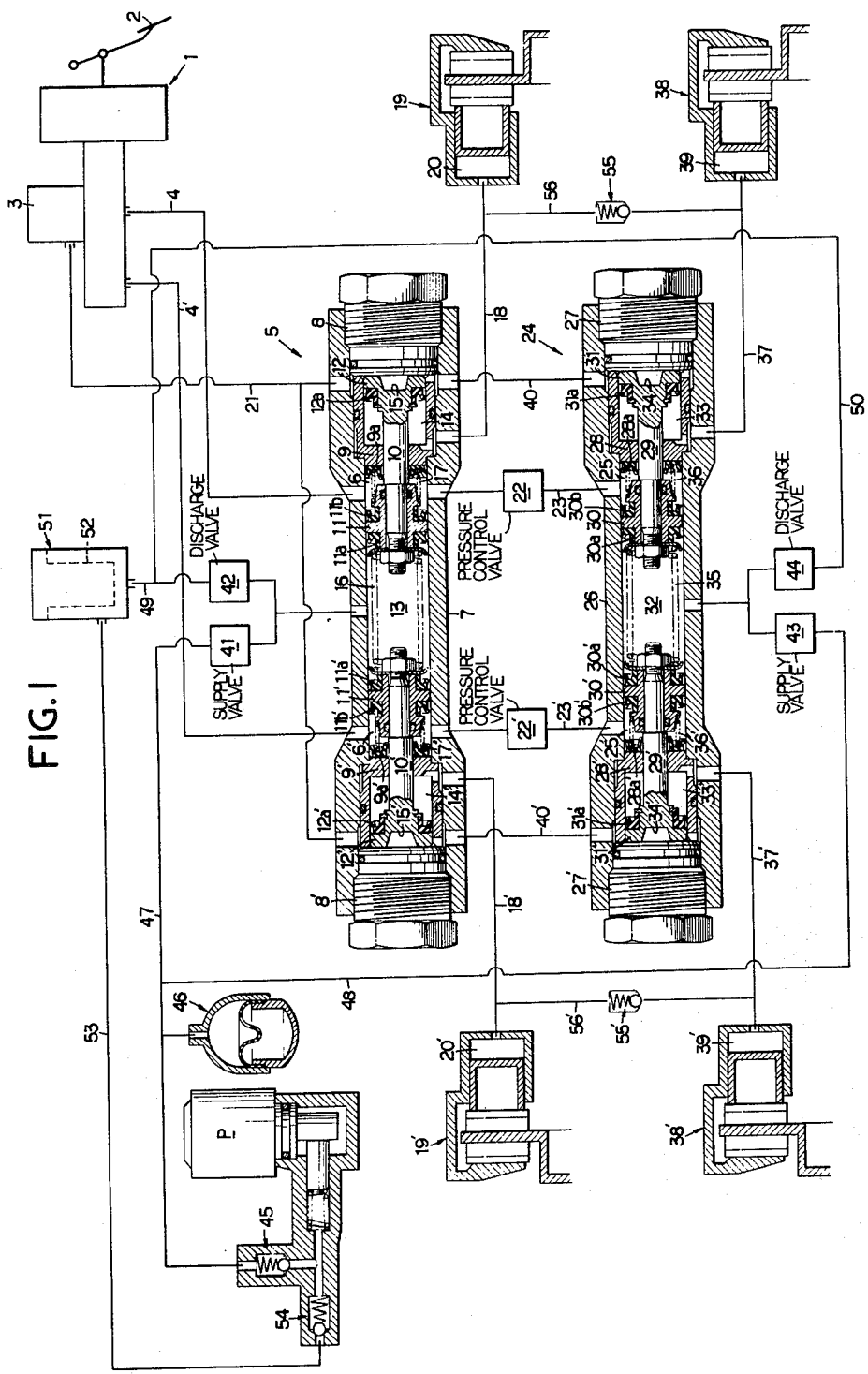
FIG. 1 diagrammatically illustrates a hydraulic system for apparatus for simultaneously adjusting fluid pressures in two systems of a dual fluid pressure system, in accordance with an embodiment of the invention and applied to an anti-lock braking system.

Hereinafter, the invention will be described with regard to a specific embodiment applied to an anti-lock braking device of a four-wheel vehicle of front engine, front wheel drive type in which the front wheels carry greater load than the rear wheels, with reference to the accompanying drawings.

Referring first to FIG. 1, therein is seen an anti-lock braking system comprising a tandem master cylinder 1 which is adapted to deliver, as a brake pedal 2 is depressed, braking fluid to primary braking hydraulic chambers 6,6' of a first braking pressure regulator 5, through a pair of passages 4,4' which constitute independent braking systems. The first braking pressure regulator 5 constitutes a device according to the invention for simultaneously adjusting fluid pressures in fluid pressure systems of a dual fluid pressure system.

The braking pressure regulator 5 comprises a cylinder 7 closed by a pair of end walls 8,8', a pair of partition walls or bulkheads 9,9' disposed in the cylinder 7 and spaced from the end walls 8,8', pairs of pistons 11,12 and 11',12' disposed in both end portions of the cylinder 7 and spaced from the end walls 8,8', and a pair of rods 10,10' connecting the pistons of each pair and axially slidably engaged in corresponding bulkheads 9,9'. The cylinder chamber 6 between the bulkhead 9 and the piston 11 constitutes a primary hydraulic chamber of a first hydraulic system and is connected to the master cylinder 1 through the passage 4. A cylinder chamber 14 between the bulkhead 9 and the piston 12 constitutes a secondary braking hydraulic chamber of the first hydraulic system and is connected to a hydraulic chamber 20 of a wheel cylinder 19 for the right front wheel though a passage 18. A cylinder chamber 15 between the end wall 8 and the piston 12 constitutes a relieving hydraulic chamber and is connected to a fluid reservoir 3 (containing brake fluid, e.g. oil) through a passage 21. The cylinder chamber 6' between the bulkhead 9' and the piston 11' constitutes a primary braking hydraulic chamber of the second hydraulic system and is connected to the master cylinder 1 through the passage 4'. A cylinder chamber 14' between the bulkhead 9' and the piston 12' constitutes a secondary braking hydraulic chamber of the second hydraulic system and is connected to the chamber 20' of the wheel cylinder 19' for the left front wheel through a passage 18'. A cylinder chamber 15' between the end wall 8' and the piston 12' constitutes a relieving oil chamber and is connected to the reservoir 3 through a passage 21. A cylinder chamber 13 between the pair of pistons 11,11' constitutes an anti-lock hydraulic chamber which is selectively supplied with pressure fluid from a second supply source comprising a pump P or discharges return fluid to the pump in an anti-lock control circuit under the action of supply control valve 41 and discharge control valve 42.

A compression spring 16 is disposed between pistons 11,11', and compression springs 17 and 17' are respectively disposed between the bulkhead 9 and the piston 11 and between the bulkhead 9' and the piston 11'. The pistons 11,12 and the pistons 11',12' undergo smooth and resilient movement by the resilient action of the springs 16,17 and 17' which also serve to hold the pistons at proper positions in the non-braking condition.

In order to prevent any leakage of the pressurized fluid between adjacent cylinder chambers, the pistons 11 and 11' are provided, on both sides thereof, with so-called cup-shaped sealing members 11a,11b and 11a',11b' of annular shape and adapted to check leaking oil. For the same purpose, cup-shaped sealing members 9a,9a' are attached to the sides of the bulkheads 9,9' adjacent to the primary braking hydraulic chambers 6,6'. Furthermore, cup-shaped sealing members 12a,12a' are attached to the sides of the pistons 12,12' adjacent to the secondary braking hydraulic chambers 14,14'. The sealing members 9a,9a' are adapted to prevent the pistons 12,12' from failing to move toward each other due to leakage of pressurized fluid from the primary braking hydraulic chamber 6,6' into the secondary braking hydraulic chambers 14,14'. The sealing members 12a,12a' prevent the pressurized fluid from leaking from the secondary braking hydraulic chambers 14,14' into the passage 21 thereby to ensure the generation of sufficiently high secondary braking pressure.

The primary braking hydraulic chambers 6,6' are further connected, through passages 23,23' containing pressure control valves 22,22', to corresponding primary braking hydraulic chambers 25,25' of a braking pressure regulator 24 which constitutes a part of the device of the invention for simultaneously adjusting the fluid pressures in two systems of a dual fluid pressure system. The second braking pressure regulator 24 basically has the same construction as the first braking pressure regulator 5. Namely, it comprises a cylinder 26 closed at both ends by a pair of end walls 27,27', a pair of partition walls or bulkheads 28,28' disposed in the cylinder 26 and spaced from the end walls 27,27' and pairs of pistons 30,31 and 30',31' disposed at both end portions of the cylinder 26. A pair of rods 29 and 29' connect the pistons of respective pairs and extend axially slidably through respective bulkheads 28,28'. A cylinder chamber 25 between the bulkhead 28 and the piston 30 constitutes a primary braking hydraulic chamber and is connected to the master cylinder 1 through a passage 23, hydraulic control valve 22, primary braking hydraulic chamber 6 of the first braking pressure regulator 5, and the passage 4. A cylinder chamber 33 between the bulkhead 28 and the piston 31 constitutes a secondary braking hydraulic chamber of the first hydraulic system and is connected to the chamber 39 of the wheel cylinder 38 for the left rear wheel through a passage 37. A cylinder chamber 34 between the end wall 27 and the piston 31 constitutes a relieving oil chamber and is connected to the reservoir 3 through a passage 40, relieving oil chamber 15 of the first braking pressure regulator 5 and the passage 21. A cylinder chamber 25' between the bulkhead 28' and the piston 30' constitutes a primary braking chamber of the second hydraulic system and is connected to the master cylinder 1 through passage 23', hydraulic control valve 22', primary braking hydraulic chamber 6' of the first hydraulic pressure regulator and passage 4'. A cylinder chamber 33' between the bulkhead 28' and the piston 31' constitutes a secondary braking hydraulic chamber of the second hydraulic system and is connected through a passage 37' to the chamber 39' of the wheel cylinder 38' for the right rear wheel. A cylinder chamber 34' between the end wall 27' and the piston 31' constitutes a relieving oil chamber and is connected with the reservoir 3 through a passage 40' relieving chamber 15' of the first braking pressure regulator 5 and the passage 21. A cylinder chamber 32 between the pistons 30,30' constitutes an anti-lock control hydraulic chamber 32 to which and from which pressure fluid flows from pump P under the control of supply and discharge control valves 43 and 44 respectively.

A compression spring 35 is disposed between the pair of pistons 30,30' and compression springs 36 and 36' are respectively interposed between the bulkhead 28 and the piston 30 and between the bulkhead 28' and the piston 30'. The pistons 30,31 and 30',31' undergo resilient and smooth movement by the resilient force of the compression springs 35,36 and 36' which also serve to hold the pistons at proper positions in the non-braking condition.

As in the case of the braking pressure regulator 5, cup-shaped sealing members 30a,30b and 30a',30b' are attached to both sides of the respective pistons 30,30', while cup-shaped sealing members 28a,28a' are attached to the sides of the bulkheads 28,28' adjacent to the primary braking hydraulic chambers 25,25'. Cup-shaped sealing members 31a,31a' are attached to the sides of the pistons 31,31' adjacent to the secondary braking hydraulic chambers 33,33'.

The hydraulic control valves 22,22' control the primary braking pressure, particularly in the period immediately after the start of the braking such that the braking force on the rear wheels (carrying less load than the front wheels) is reduced as compared to the braking force on the front wheels carrying greater load, in proportion to the load. As a result of the pressure reducing operation performed by the pair of hydraulic control valves 22,22', the hydraulic pressure in the pair of primary braking hydraulic chambers 6,6' is raised as compared with the hydraulic pressure in the pair of primary braking hydraulic chambers 25,25', in proportion to the ratio of the load, particularly in the period immediately after the commencement of braking. As a consequence, in the period immediately after the commencement of braking, the hydraulic pressure generated in the secondary braking hydraulic chambers 14,14' for the front wheels is higher than that generated in the secondary braking hydraulic chambers 33,33' for the rear wheels. The control valves 22 and 22' are conventional pressure-reducing or load responsive valves familiar to those skilled in the art.

In the event that the transmission of hydraulic pressure to the wheel cylinders 19,19' for the front wheels fails due to trouble in the secondary braking hydraulic system, the reduction in the braking effort in the automobile is greater than the case where the trouble takes place in the secondary braking hydraulic system for the rear wheels. In order to eliminate such disadvantage, the pair of hydraulic passages 18 and 18' are connected to corresponding passages 37,37' through passages 56,56' provided with respective check valves 55,55'. The check valves 55,55' operate as follows. Assuming that at least one of the secondary braking hydraulic chambers 14,14' fails to generate secondary braking pressure due to trouble in the secondary braking hydraulic system of a front wheel, the hydraulic pressure in the wheel cylinder chambers 39,39' for the rear wheels may become higher than the pressure in the wheel cylinder chambers 20,20' for the front wheels by a pressure exceeding a predetermined set value. In such a case, the check valves 55,55' operate to permit the hydraulic pressure in the secondary hydraulic chambers 33,33' for the rear wheels to be transmitted without delay to corresponding wheel cylinder chamber 20 or 20' for the front wheels.

In the anti-lock control system, control fluid, such as oil is pressurized by the further supply source comprising pump P which was to be a pump or the like and the control oil is delivered to the supply control valve 41 via check valve 45 and a passage 47 which is connected to a pressure accumulator 46. The control oil is also delivered to the supply control valve 43 through a passage 48 shunted from the passage 47.

The control oil discharged from the discharge control valve 42 is delivered to an oil tank 51 through a passage 49, while the control oil discharged from the discharge control valve 44 is delivered to the oil tank 51 through passages 50 and 49. The control oil in the oil tank 51 is constrained to flow through a filter 52 and it then flows through a passage 53 and a check valve 54 to be pressurized again by the hydraulic pressure source P.

Next will be described apparatus for controlling the opening and closing of the supply control valves 41,43 and the discharge control valves 42,44 in the anti-lock control system.

Referring to FIG. 2, the supply control valve 41 and the discharge control valve 42 are adapted to be opened and closed by a late-period operation type anti-lock control pressure supply device 65, whereas the supply control valve 43 and the discharge control valve 44 are adapted to be opened and closed by an early-period type anti-lock control pressure supply device 66. A signal generated by a wheel speed detector 57 for the right front wheel is transformed by a wheel speed calculation device 59 into a wheel speed signal having a value proportional to the peripheral speed of the right front wheel. The wheel speed signal is delivered to a high-speed selector 61 such as a high-select circuit. Meanwhile, a signal generated by a wheel speed detector 57' for the left front wheel is transformed by a wheel speed calculation device 59' into a wheel speed signal having a value proportional to the peripheral speed of the left front wheel. The signal is then delivered to the high-speed selector 61. The high-speed selector then selects the higher one of the wheel speed signals representing the wheel speeds of the left and right front wheels, and delivers the selected signal to a control circuit 63 for the front wheels. The control circuit 63 for the front wheels calculates the slip rate of the wheel of higher peripheral speed and acceleration or deceleration of the same, and normally holds the supply control valve 41 and the discharge control valve 42 respectively in the closed and opened states. However, when the wheel of higher peripheral speed, i.e. the wheel locked later than the other, becomes locked, the control circuit 63 for the front wheels immediately opens the supply control valve 41 while closing the discharge control valve 42, thereby to permit the control oil to be supplied from the hydraulic pressure source P to the anti-lock control hydraulic chamber 13.

On the other hand, a signal produced by a wheel speed detector 58' for right rear wheel is transformed by a wheel speed calculator 60' to a wheel speed signal having a value proportional to the peripheral speed of the rear wheel. The wheel speed signal is then delivered to a low-speed selector 62 such as a low-select circuit. Meanwhile, the signal generated by a wheel speed detector 58 for the left rear wheel is transformed by a wheel speed calculator 60 into a wheel speed signal having a value proportional to the peripheral speed of the left rear wheel and the wheel speed signal thus obtained is delivered to the low-speed selector 62. The low speed selector 62 selects the lower one of the wheel speed signals and delivers the same to a control circuit 64 for the rear wheels. The control circuit 64 for the rear wheels calculates the slip rate and acceleration or deceleration of the wheel of lower peripheral speed and normally holds the supply control valve 43 and the discharge control valve 44 in the closed and opened states respectively. However, when the rear wheel of lower peripheral speed, i.e. the wheel locked earlier than the other, becomes locked, the control circuit 64 immediately opens the supply valve 43 while closing the discharge valve 44 thereby to permit the control oil to be supplied from the hydraulic pressure source P to the anti-lock control hydraulic chamber 32.

The supply control valve 41,43 and the discharge control valves 42,44 may be solenoid-actuated control valves in which the supply control valves 41,43 are closed when de-energized and opened when energized, while the discharge control valves 42,44 are opened when de-energized and closed when energized.

In the braking system having the described construction, as the brake pedal 2 is depressed, the braking pressure produced in the master cylinder 1 is transmitted to the primary braking hydraulic chambers 6,6' for the front wheels through the passages 4,4' and also to the primary braking hydraulic chambers 25,25' through the passages 23,23'. As a consequence, pairs of pistons 11,11' and 30,30' are acted on by the primary braking hydraulic pressure in the primary braking hydraulic chambers 6,6' and 25,25', respectively, so that the rods 10 and 10' and rods 29 and 29' are moved towards each other in respective cylinders 7 and 26, thereby to produce secondary braking hydraulic pressures in the secondary braking hydraulic chambers 14,14' and 33,33'. In this state, by the operation of the pair of hydraulic control valves 22,22', the primary braking pressure in the primary braking hydraulic chambers 25,25' for the rear wheels is adjusted to be lower than the primary braking hydraulic chambers 6,6' for the front wheels by an amount corresponding to the difference of the load applied to the rear and front wheels, so that the secondary braking pressure generated in the secondary braking hydraulic chambers 33,33' for the rear wheels is lower than that generated in the secondary braking hydraulic chambers 14,14' for the front wheels by an amount corresponding to the load on the rear and front wheels.

The secondary braking pressure in the secondary braking hydraulic chambers 14,14' for the front wheels is immediately transmitted through respective passages 18,18' to the chamber 20 of the right front wheel cylinder 19 and the chamber 20' of the left front wheel cylinder 19' thereby to effect braking on the left and right front wheels. At the same time, the secondary braking pressure generated in the secondary hydraulic chambers 33,33' is transmitted through passages 37,37' to the hydraulic chamber 39 of the left rear wheel cylinder 38 and the chamber 39' of the right rear wheel cylinder 38' thereby to effect braking on the left and rear wheels.

If it is assumed that the hydraulic pressure in the wheel cylinder chamber 39 or 39' of a rear wheel becomes higher than the wheel cylinder chamber 20 or 20' of a front wheel by an amount exceeding the set pressure of the corresponding check valve 55 or 55', due to trouble in the secondary braking hydraulic system of the front wheel, hydraulic pressure is transmitted from the corresponding secondary braking hydraulic chamber 33 or 33' to the passage 56 or 56' to the wheel cylinder chamber 20 or 20' of the affected front wheel, thereby to compensate for the loss of braking force for the front wheels.

Assuming that the front wheel, which is locked later than the other front wheel becomes locked, the late-period type anti-lock control oil supplying device 65 operates to open the normally closed supply valve 41, while closing the normally open discharge valve 42, so that the control oil supplied from the hydraulic pressure source P is immediately introduced into the anti-lock control hydraulic chamber 13 thereby to urge the pistons 11,11' away from each other. As a consequence, the secondary braking pressure in the secondary braking chambers 14,14' is lowered so that the braking force applied to the left and right front wheels by their respective wheel cylinders 19,19' is decreased or eliminated until at least one of the front wheels is unlocked. Meanwhile, the fluid in the relieving chambers 15,15' is pressurized by respective pistons 12,12' and is returned to the reservoir 3 through the passage 21.

On the other hand, when at least one of the rear wheels is locked during braking, the early-period operation type anti-lock control device 66 operates to open the normally closed supply control valve 43 while closing the normally open discharge control valve 44, so that the control oil from the hydraulic pressure source P is immediately introduced into the anti-lock control chamber 32 thereby to urge the pistons 30,30' away from each other. As a consequence, the secondary braking pressure in the secondary braking chambers 33,33' is lowered so that the braking force on the left and right rear wheels provided by the wheel cylinders 38,38' is decreased or eliminated until the left and right rear wheels are unlocked. Meanwhile, the fluid in the relieving chambers 34,34' is pressed by respective pistons 31,31' and returned to the reservoir 3 through the passages 40,40', relieving chambers 15,15' and the passage 21.

In the embodiment described hereinbefore, the dual fluid pressure system has been disclosed as a hydraulic braking system. This, however, is not essential and the invention can equally be applied to other hydraulic systems than a braking system, as well as to fluid systems using fluids other than oil, e.g. air or the like.

As has been described, according to the invention, there is provided apparatus comprising cylinder 7 closed at both ends thereof and provided therein with a pair of bulkheads 9,9' and a pair of rods 10,10' each carrying at its both ends a pair of pistons, 11,12 and 11',12' and slidably extending through corresponding bulkheads, such that primary fluid pressure chambers 6,6' are formed between first pistons 11,11' and opposed bulkheads, while secondary fluid pressure chambers 14,14' are formed between second pistons, 12,12' and opposed bulkheads, with control fluid pressure chamber 13 between first pistons 11,11'. As a consequence, it is possible to generate, in each of two fluid pressure systems of a dual fluid pressure arrangement, secondary fluid pressure in response to the primary fluid pressure supplied from the independent fluid pressure source 1, and to deliver the secondary fluid pressure of each fluid pressure system to the hydraulically operated devices 19,19' associated with the fluid pressure system thereby to actuate these devices. In addition, the secondary fluid pressures in two fluid pressure systems can be adjusted simultaneously simply by introducing control fluid pressure to the control fluid pressure chamber 13'. It is thus possible to obtain a device for simultaneously adjusting the fluid pressures in the fluid pressure systems of a dual fluid pressure arrangement capable of operating without fail and having a simple construction, simple circuit arrangement and high utility.

A second feature of the invention is that the cup-shaped sealing members 9a,9a' attached to the sides of the bulkheads adjacent to the primary fluid pressure chambers effectively prevent the pressurized fluid in the primary fluid pressure chambers from leaking into the secondary fluid pressure chambers 14,14' to assure the function of second pistons 12,12' to move towards each other which may, otherwise, be unattained due to the leakage. In addition, the leakage of pressurized fluid from the secondary fluid pressure chambers 14,14' to the outside is effectively prevented by the cup shaped sealing members 12a,12'a attached to the pistons, 12,12' so that the generation of sufficient secondary pressures in the secondary fluid pressure chambers, 14,14' is ensured. This futher ensures the operation of the apparatus for simultaneously adjusting the fluid pressures in the two fluid pressure systems in the dual fluid pressure arrangement.

Although the invention has been described in conjunction with a specific embodiment thereof, it will become apparent to those skilled in the art that numerous modifications and variations can be made within the scope and spirit of the invention as defined in the attached claims.

What is claimed is:

1. Apparatus for simultaneously adjusting the fluid pressures in a dual hydraulic circuit arrangement in which in a first hydraulic circuit pressurized fluid is supplied from a first pressure source to a first fluid pressure activated device and in a second hydraulic circuit pressurized fluid is supplied from a second pressure source to a second fluid pressure activated device, said apparatus comprising:
    a cylinder having opposite closed ends and including spaced bulkheads therein defining a central chamber between the bulkheads and a pair of chambers on respective opposite sides of the bulkheads,
    a pair of spaced first pistons slidably mounted in said central chamber and defining a control pressure chamber therebetween and first and second primary fluid pressure chambers between respective pistons and said bulkheads,
    said first primary fluid pressure chamber being connected to said first pressure source while said second primary fluid pressure chamber is connected to said second pressure source,
    a pair of second pistons secured for common movement with said first pistons, said second pistons being respectively mounted between said bulkheads and the closed ends of said cylinder and defining first and second secondary fluid pressure chambers between the second pistons and respective bulkheads,
    said first and second secondary chambers being respectively connected to said first and second fluid pressure activated devices of said first and second hydraulic circuits, and
    means for supplying a pressure fluid at a control pressure from a third pressure source to said control pressure chamber between said first pistons for simultaneously adjusting the pressures in said first and second secondary chambers and thereby in said first and second pressure activated devices of said first and second hydraulic circuits.

2. Apparatus as claimed in claim 1 further comprising first and second piston rods slidably mounted in respective bulkheads and connecting said first and second pistons for common movement in pairs.

3. Apparatus as claimed in claim 2 comprising fluid pressure regulating means between said third pressure source and said control pressure chamber between said pistons and including valve means for controlling flow of pressure fluid from said third source to and from said control pressure chamber for controlling the fluid pressures transmitted to said pressure activated devices.

4. Apparatus as claimed in claim 3 wherein said valve means has one state in which pressure fluid from said third pressure source does not flow to said control pressure chamber but is free to flow from said chamber whereby said first and second secondary fluid pressure chambers can freely contract and a second state in which pressure fluid from said third pressure source flows to said control fluid pressure chamber to expand said first and second secondary chambers.

5. Apparatus as claimed in claim 4 wherein said valve means includes a first valve having a normally closed state and a second valve having a normally open state, said first valve controlling flow of pressure fluid from said third source to said control pressure chamber, said second valve controlling flow of pressure fluid from said control pressure chamber back to said third source, the first valve being opened when the second valve is closed, and means for operating said first and second valves.

6. Apparatus as claimed in claim 3 further comprising first spring means engaging said first pistons for opposing displacement thereof towards one another, and second spring means opposing movement of said first pistons towards their respective bulkheads.

7. Apparatus as claimed in claim 1 further comprising first cup-shaped sealing members attached to said bulkheads on the sides thereof facing the respective primary fluid pressure chambers and second cup-shaped sealing members attached to said second pistons on the sides thereof facing said secondary fluid pressure chambers.

8. Apparatus as claimed in claim 1 wherein the first hydraulic circuit includes a third fluid pressure activated device and the second hydraulic circuit includes a fourth pressure activated device, said apparatus further comprising a second cylinder having opposite closed ends, spaced bulkheads in said second cylinder, and pairs of first and second pistons in said second cylinder defining in said second cylinder, a control pressure chamber, first and second primary fluid pressure chambers, and first and second secondary fluid pressure chambers, the first and second primary fluid pressure chambers of the second cylinder being respectively connected to the first and second primary fluid pressure chambers of the first cylinder, the first and second secondary fluid pressure chambers of the second cylinder being respectively connected to the third and fourth pressure activated devices, and means for supplying to said control pressure chamber of said second cylinder said pressure fluid from said third source at a control pressure.

9. Apparatus as claimed in claim 8 comprising first fluid pressure regulating means between said third source of pressure and said control chamber of said first cylinder and second fluid pressure regulating means between said third source of pressure and said control chamber of said second cylinder, said first and second fluid pressure regulating means respectively controlling the supply of pressure fluid to said control chambers of said first and second cylinders from said third source.

10. Apparatus as claimed in claim 8 comprising pressure control valve means between the respectively connected first and second primary fluid pressure chambers of said first and second cylinders.

11. A method of simultaneously adjusting the fluid pressures in a dual hydraulic circuit arrangement in which in a first hydraulic circuit pressurized fluid is supplied from a first pressure source to a first fluid pressure activated device and in a second hydraulic circuit pressurized fluid is supplied from a second pressure source to a second fluid pressure activated device, said method comprising:

supplying the fluid pressures in the first and second hydraulic circuits to respective first and second primary chambers bounded by respective slidable pistons which permit expansion and contraction of said primary chambers, supplying the first and second fluid pressure activated devices with pressurized fluid from respective first and second secondary fluid chambers bounded by respective additional slidable pistons which permit expansion and contraction of said secondary chambers, contracting said primary chambers simultaneously in response to a control pressure from a third pressure source, and expanding said secondary chambers in response to the contracting of said primary chambers and in proportion thereto to adjust the pressures in said fluid pressure activated devices in said first and second hydraulic circuits.

12. A method as claimed in claim 11 comprising concurrently moving the pistons bounding the first and second primary chambers and the additional pistons bounding the first and second secondary chambers in respective pairs such that when the primary chambers are contracted the secondary chambers are expanded and vice versa.

13. A method as claimed in claim 12 comprising controlling the pressure supplied from the third pressure source in response to an operative condition of said pressure activated devices.

* * * * *